May 26, 1925.
S. I. FEKETE ET AL
1,539,352
SPRING SUSPENSION FOR AUTOMOBILES
Filed July 26, 1923
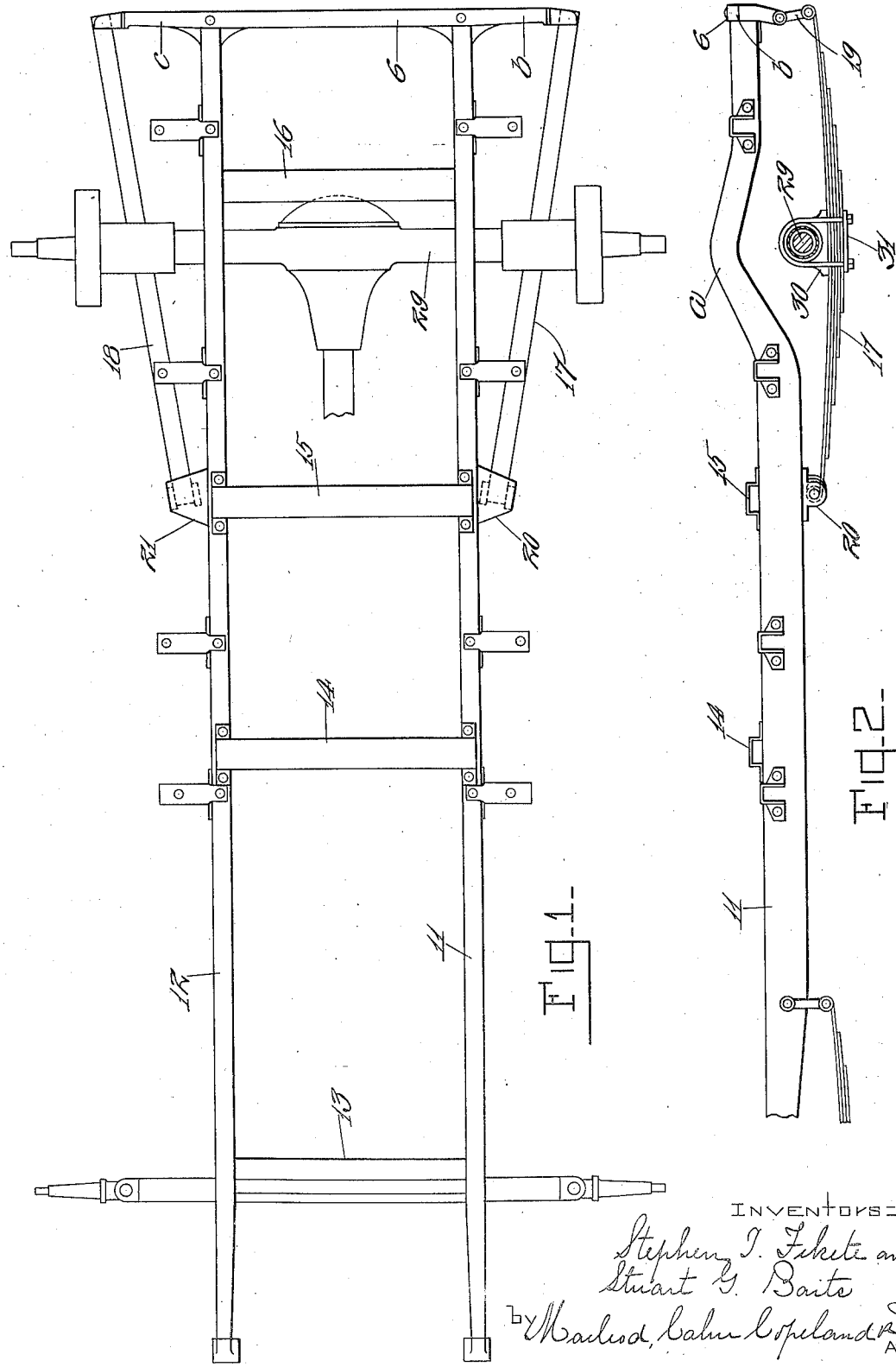

Patented May 26, 1925.

1,539,352

UNITED STATES PATENT OFFICE.

STEPHEN I. FEKETE AND STUART G. BAITS, OF DETROIT, MICHIGAN, ASSIGNORS TO HUDSON MOTOR CAR COMPANY, OF DETROIT, MICHIGAN, A CORPORATION OF MICHIGAN.

SPRING SUSPENSION FOR AUTOMOBILES.

Application filed July 26, 1923. Serial No. 653,927.

*To all whom it may concern:*

Be it known that we, STEPHEN I. FEKETE and STUART G. BAITS, citizens of the United States, residing at Detroit, county of Wayne, and State of Michigan, have invented a certain new and useful Improvement in Spring Suspensions for Automobiles, of which the following is a specification, reference being had therein to the accompanying drawings.

The present invention has for its object to provide an improved combination of chassis frame and springs for motor vehicles which shall be more satisfactory to the user because of improved riding qualities and also because less strain is transmitted to the body and consequently the body is less subject to body noises, loose doors, and injury to the finish.

The improved riding qualities manifest themselves in several ways. The automobile containing the embodiment of the present invention holds the road well at high speed, pitches but little when a series of transverse obstructions are encountered, and is exceptionally free from swaying or rolling on corners or on roads which slope sideways.

The chassis frame and springs embodying the present invention are also particularly adapted for automobiles when radius rods are not employed and the drive is through the springs.

The invention will be fully understood when taken in connection with the accompanying drawings and the novel features thereof will be pointed out and clearly defined in the claims at the close of this specification.

In the drawings:

Fig. 1 is a plan view of a frame and springs embodying the present invention.

Fig. 2 is a side elevation of the parts shown in Fig. 1.

Referring now to the drawings:

At 11 and 12 are shown two parallel side members, bent upward at $a$ to form the usual kick-up, and spaced apart from each other by cross members, 13, 14, 15, and 16. Of these cross members which may be of any desired number, the front four 13, 14, 15 and 16 are of equal length. The side members 11 and 12 being relatively near together, the cross members are short and therefore the rigidity of the frame is increased for a given section and weight of metal.

The rear cross member 6 is extended laterally beyond the side members to form two spring horns $b$ and $c$ to which the rear ends of semi-elliptic springs 17 and 18 are secured by shackles 19. The spring horns $b$ and $c$ are relatively more flexible than the remainder of the cross member 6 and absorb some of the shocks and strains which would otherwise be transmitted to the body of the vehicle. At 29 is shown the rear axle which is attached to the springs by saddles 30 and yokes 31. The springs 17 and 18 are secured at their front ends to brackets 20 and 21 being pivoted directly thereto without the use of spring shackles and the front eyes of the springs are at about the level of the under side of the frame and closely adjacent the side members. Since the spring horns $b$ and $c$ project considerably beyond the sides of the frame, the springs are oblique and their rear ends are farther apart than their front ends. This oblique position of the springs greatly reduces the tendency of the vehicle to roll or to sway sideways, especially on curves and corners.

Since the front ends of the springs are secured to the side members of the frame without the use of spring shackles, no radius rods are required.

The construction embodying the present invention is such that the rectangular portion of the frame, this portion being that defined by the front cross member 13, the two side members 11 and 12 and the rear cross member 6 is very narrow, the side members being placed relatively near together, and therefore the warping or twisting of the frame which occurs when one wheel is raised or lowered is greatly reduced. These strains which would otherwise be transmitted to the body are largely absorbed by the springs and horns, and this relieves the body from strains, which would otherwise eventually cause rattles, squeaks and other noises, loosen the doors, open the seams and otherwise injure the finish of the body.

What we claim is:

1. In combination, a chassis frame having side members connected at their rear ends by a rear cross member extending laterally beyond said side members to form horns, springs, the rear ends of which are secured respectively to the outer ends of said horns, the front ends of the springs being attached at about the line of the side frame members and a rear axle secured to the springs intermediate their ends.

2. In combination, a pair of semi-elliptical springs, a rear axle secured thereto intermediate the ends thereof, a chassis frame having side members which are relatively near together, and having a rear cross member the ends of which extend laterally beyond said side members to form spring horns, said springs being arranged diagonally with their rear ends secured to the said spring horns and the front ends to the side members of the frame about on a level with the under side.

3. In combination, a pair of semi-elliptical springs, an axle connected thereto intermediate the ends of the springs, a chassis frame having parallel side members which are relatively near together, and having a rear cross member the ends of which extend laterally beyond said side members to form spring horns, spring shackles connecting the rear end of the springs with the respective horns, the front ends of said springs being pivoted directly to said side members and said springs serving to position said axle.

4. In combination, a chassis frame having parallel side members connected at their rear ends by a rear cross member extending laterally beyond said side members to form horns, said horns having greater flexibilty than the remainder of the cross member, springs arranged obliquely to the side members and secured at their rear ends to the said horns and a rear axle secured to the springs intermediate their ends.

In testimony whereof we affix our signatures.

STEPHEN I. FEKETE.
STUART G. BAITS.